(12) United States Patent
Ko et al.

(10) Patent No.: US 11,165,322 B2
(45) Date of Patent: Nov. 2, 2021

(54) VARIABLE FLUX MOTOR

(71) Applicant: LG ELECTRONICS INC., Seoul (KR)

(72) Inventors: Hyojin Ko, Seoul (KR); Seungsuk Oh, Seoul (KR); Dosun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 182 days.

(21) Appl. No.: 16/489,868

(22) PCT Filed: Jan. 30, 2018

(86) PCT No.: PCT/KR2018/001297
§ 371 (c)(1),
(2) Date: Aug. 29, 2019

(87) PCT Pub. No.: WO2018/169203
PCT Pub. Date: Sep. 20, 2018

(65) Prior Publication Data
US 2020/0014289 A1 Jan. 9, 2020

(30) Foreign Application Priority Data
Mar. 14, 2017 (KR) .................... 10-2017-0031976

(51) Int. Cl.
*H02K 21/02* (2006.01)
*H02K 1/02* (2006.01)

(52) U.S. Cl.
CPC ............ *H02K 21/029* (2013.01); *H02K 1/02* (2013.01)

(58) Field of Classification Search
CPC .... H02K 1/276; H02K 1/2766; H02K 1/2733; H02K 1/02; H02K 2213/03
See application file for complete search history.

(56) References Cited

U.S. PATENT DOCUMENTS

| | | | |
|---|---|---|---|
| 6,847,143 B1* | 1/2005 | Akemakou | H02K 21/042 310/154.38 |
| 8,552,678 B2 | 10/2013 | Lin et al. | |
| 2015/0001980 A1* | 1/2015 | Zhang | H02K 1/02 310/156.43 |

FOREIGN PATENT DOCUMENTS

| | | |
|---|---|---|
| JP | 2002-540754 | 11/2002 |
| JP | 2011-135638 | 7/2011 |
| JP | 3204358 | 6/2016 |

(Continued)

OTHER PUBLICATIONS

International Search Report (with English Translation) dated May 23, 2018 issued in Application No. PCT/KR2018/001297.

(Continued)

*Primary Examiner* — Dang D Le
(74) *Attorney, Agent, or Firm* — KED & Associates, LLP (57) ABSTRACT

The present invention relates to a variable-flux motor comprising: a stator having stator coils; and a rotor disposed to be rotatable with respect to the stator with an air gap interposed therebetween, wherein the rotor comprises: a rotor core; a fixed magnet disposed along the radial direction of the rotor core, and of which one end portion is disposed adjacently to the air gap; and a variable magnet disposed inside the fixed magnet along the radial direction of the rotor core, and the variable magnet is formed such that a magnetic flux thereof varies when a preset current is applied to the stator coils. Therefore, use of an expensive permanent magnet can be excluded.

18 Claims, 10 Drawing Sheets

(56) References Cited

FOREIGN PATENT DOCUMENTS

| JP | 2017-011858 | 1/2017 |
|---|---|---|
| KR | 10-1407854 | 6/2014 |
| KR | 10-2014-0109068 | 9/2014 |

OTHER PUBLICATIONS

Written Opinion dated May 23, 2018 issued in Application No. PCT/KR2018/001297.
Korean Specification filed Mar. 14, 2017 of KR Application No. 10-2017-0031976.
Korean Office Action dated Apr. 6, 2018 issued in KR Application No. 10-2017-0031976.
Korean Notice of Allowance dated Oct. 11, 2018 issued in KR Application No. 10-2017-0031976.

* cited by examiner

VARIABLE FLUX MOTOR

CROSS-REFERENCE TO RELATED PATENT APPLICATIONS

This application is a U.S. National Stage Application under 35 U.S.C. § 371 of PCT Application No. PCT/KR2018/001297, filed Jan. 30, 2018, which claims priority to Korean Patent Application No. 10-2017-0031976, filed Mar. 14, 2017, whose entire disclosures are hereby incorporated by reference.

FIELD

The present invention relates to a variable flux motor.

BACKGROUND

As is well known, an electric motor is an apparatus that converts electric energy into mechanical energy.

Electric motors are classified into a direct current (DC) type, a single phase alternating current (AC) type, and a three-phase AC type depending on an electric power (or power) supply system.

Such an electric motor generally includes a stator, and a rotor disposed to be movable relative to the stator.

A part of the rotor includes a rotor core, a plurality of conductor bars inserted into the rotor core in an axial direction, and an end ring shorting the conductor bars.

Another part of the rotor includes permanent magnets.

However, the related art motor is configured to be driven with a preset torque in a preset specific speed zone. When the motor is operated at slower or faster speed than the specific speed, operation efficiency of the motor may be lowered.

Among some motors having permanent magnets in consideration of such a problem, a so-called variable flux motor having a fixed magnet in which magnetic flux of a permanent magnet of a rotor relatively less changes, and a variable magnet in which magnetic flux can vary.

However, in the related art variable flux motor, the fixed magnet is formed of a magnetic material having a high coercive force, and the variable magnet is also formed of a magnetic material that can be easily magnetized and demagnetized, which causes drastic increase in fabricating cost.

Also, in several variable flux motors, a first magnet and a second magnet having a lower coercive force than the first magnet are disposed on the same circumference along a circumferential direction, and a plurality of first magnets is arranged on each of both sides of the second magnet. The second magnet is formed of a high-priced magnetic material, thereby increasing a fabricating cost.

In addition, an ear and a groove are formed in each tooth of a stator core, which makes the configuration of the stator complicated, thereby increasing the number of fabrication processes.

DISCLOSURE

Technical Problem

Therefore, one aspect of the present disclosure is to provide a variable flux motor capable of excluding use of high-priced permanent magnets.

Another aspect of the present disclosure is to provide a variable flux motor, capable of improving magnetization efficiency and demagnetization efficiency by concentrating flux of a variable magnet during magnetization and demagnetization of the variable magnet.

Still another aspect of the present disclosure is to provide a variable flux motor capable of reducing the number of permanent magnets, so as to facilitate fabrication.

Technical Solution

In order to achieve those aspects and other advantages according to the embodiment of the present disclosure, there is provided a variable flux motor, including a stator having a stator coil, and a rotor rotatably disposed in the stator with a gap from the stator, wherein the rotor includes a rotor core, a fixed magnet disposed along a radial direction of the rotor core and having one end portion adjacent to the gap, and a variable magnet disposed at an inner side of the fixed magnet along the radial direction of the rotor core, wherein the variable magnet has a lower coercive force than the fixed magnet, and wherein the variable magnet has a magnetic flux varying when a preset current is applied to the stator coil.

According to one embodiment of the present disclosure, the fixed magnet and the variable magnet may be arranged in a linear shape along the radial direction of the rotor, and the fixed magnet may be disposed at an outer side of the variable magnet.

According to one embodiment of the present disclosure, the variable magnet may have a lower coercive force than the fixed magnet.

According to one embodiment of the present invention, the fixed magnet and the variable magnet may be magnetized so that different magnetic poles are arranged along a circumferential direction of the rotor, respectively.

According to one embodiment of the present invention, the rotor core may be provided with an inter-magnet flux barrier having one end portion disposed at a boundary between the fixed magnet and the variable magnet and another end portion adjacent to the gap.

According to one embodiment of the present invention, the rotor core may be provided with a variable magnet flux barrier having one end portion disposed adjacent to the variable magnet and another end portion disposed adjacent to the gap.

According to one embodiment of the present invention, the rotor may be disposed inside the stator, and the stator may include a stator core having a plurality of slots and a plurality of teeth, and a stator coil wound around the stator core.

The stator core may have 36 slots, and the rotor may have six fixed magnets and six variable magnets.

According to one embodiment of the present invention, the variable magnet may be formed to have a longer radial length than the fixed magnet.

According to one embodiment of the present invention, the rotor core may include an inter-magnet flux barrier having one end portion disposed adjacent to a boundary area between the fixed magnet and the variable magnet and another end portion disposed adjacent to the gap, and a variable magnet flux barrier having one end portion adjacent to the variable magnet and another end portion adjacent to the gap.

According to one embodiment of the present invention, when an end portion of the fixed magnet is disposed to correspond to a first tooth as one of the plurality of teeth, the inter-magnet flux barrier may be formed so that an end portion thereof is located to correspond to a slot between a second tooth and a third tooth adjacent to the first tooth.

According to one embodiment of the present invention, the variable magnet flux barrier may be formed so that an end portion thereof is located to correspond to a slot between the third tooth and a fourth tooth, when the end portion of the fixed magnet is disposed to correspond to the first tooth.

According to one embodiment of the present invention, the rotor core may further include an inter-magnetic pole flux barrier formed along the radial direction of the rotor core between the variable magnets consecutively arranged along the circumferential direction of the rotor core.

According to one embodiment of the present invention, the inter-magnetic pole flux barrier may be formed such that an inner width thereof gradually increases toward a center of the rotor core.

According to one embodiment of the present invention, the rotor core may include a fixed magnet inserting portion into which the fixed magnet is inserted.

The fixed magnet inserting portion may be formed in a cutting manner to communicate with the gap.

According to one embodiment of the present invention, the fixed magnet may be a neodymium magnet and the variable magnet may be a ferrite magnet.

According to one embodiment of the present invention, the fixed magnet and the variable magnet may be integrally formed in an injection-molding manner.

According to one embodiment of the present invention, the variable magnet may be magnetized by the stator coil so that a magnetic flux is increased, before the rotor is operated at a preset first speed.

According to one embodiment of the present invention, the variable magnet may be demagnetized by the stator coil so that a magnetic flux is decreased, before the rotor is operated at a second speed faster than the first speed.

Advantageous Effects

As described above, according to one embodiment of the present invention, use of high-priced permanent magnets can be avoided by enhancing magnetization and demagnetization efficiencies by way of proper arrangement of the permanent magnets. This may result in reducing a fabrication cost.

Also, since a fixed magnet and a variable magnet are integrally formed with each other, the number of permanent magnets to be installed can be reduced, and fabrication of a rotor can be facilitated accordingly.

By providing an inter-magnet flux barrier disposed at a boundary between the fixed magnet and the variable magnet, magnetic flux passages can be secured at the moment of magnetizing and demagnetizing the variable magnet, thereby enhancing magnetization and demagnetization efficiencies.

By providing at one side of the variable magnet a variable magnet flux barrier which has one end portion adjacent to the variable magnet and another end portion adjacent to a gap (air gap), magnetic flux passages can be secured at the moment of magnetizing and demagnetizing the variable magnet, thereby further enhancing the magnetization and demagnetization efficiencies.

The variable magnet can be magnetized by a stator coil such that the magnetic flux is increased, before the rotor is operated at a preset first speed. Accordingly, when the rotor rotates at the first speed, torque can be increased, thereby enabling a high-torque operation.

The variable magnet can also be demagnetized by the stator coil such that the magnetic flux is decreased, before the rotor is operated at a second speed faster than the first speed. Accordingly, when the rotor rotates at the second speed, torque can be decreased, thereby enhancing operation efficiency.

BEST MODE FOR CARRYING OUT EMBODIMENTS OF THE DISCLOSURE

Hereinafter, embodiments disclosed in this specification will be described in detail with reference to the accompanying drawings. In this specification, the same or equivalent components may be provided with the same or similar reference numbers even in different embodiments, and description thereof will not be repeated. A singular representation may include a plural representation unless it represents a definitely different meaning from the context. In describing the present invention, if a detailed explanation for a related known technology or construction is considered to unnecessarily divert the gist of the present disclosure, such explanation has been omitted but would be understood by those skilled in the art. It should be noted that the attached drawings are provided to facilitate understanding of the embodiments disclosed in this specification, and should not be construed as limiting the technical idea disclosed in this specification by the attached drawings.

Figure 1:
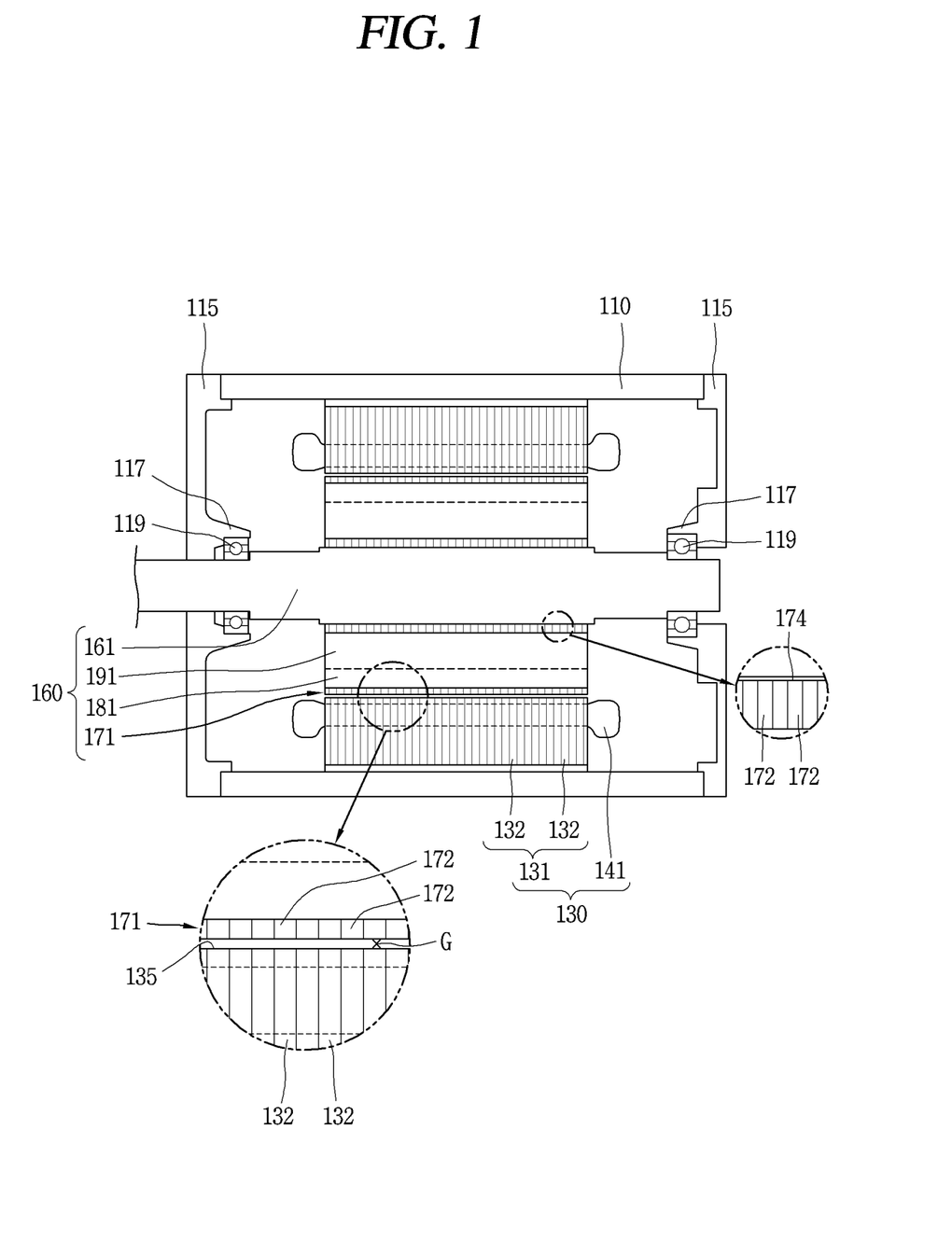
FIG. 1 is a sectional view of a variable flux motor in accordance with one embodiment of the present disclosure.

FIG. 1 is a sectional view of a variable flux motor in accordance with one embodiment of the present disclosure.

As illustrated in FIG. 1, a variable flux motor according to one embodiment of the present disclosure may include a stator 130 having a stator coil 141, and a rotor 160 rotatably disposed in the stator 130 with a gap G from the stator 130. The rotor 160 may include a rotor core 171, a fixed magnet 181 disposed in a radial direction of the rotor core 171 with its one end located close to the gap G, and a variable magnet 191 disposed at an inner side of the fixed magnet 181 in the radial direction of the rotor core 171.

The stator 130 may be supported by a frame 110.

The frame 110 may be formed in a cylindrical shape with an accommodation space therein, for example.

The frame 110 may have both sides opened.

Covers 115 may be provided on both sides of the frame 110.

The covers 115 may be detachable from the frame 110.

The rotor 160 may be provided at the inner side of the stator 130.

The rotor 160 may be rotatable centering on a rotating shaft 161 located in its center.

Both sides of the rotating shaft 161 may be rotatably supported by bearings 119.

The bearings 119 may be provided in the covers 115, respectively, for example.

The covers 115 may be provided with bearing coupling portions 117 to which the bearings 119 are coupled, respectively.

The stator 130, for example, may include a stator core 131 having a rotor accommodating hole 135 therein, and a stator coil 141 wound around the stator core 131.

The stator core 131, for example, may be formed by stacking in an insulating manner a plurality of electric steel plates 132 each having the rotor accommodating hole 135 through a center thereof.

The frame 110 may be formed in a cylindrical shape so that at least one area can be in surface contact with an outer surface of the stator core 131, for example.

The rotor 160 may include a rotor core 171, a fixed magnet 181 disposed in a radial direction of the rotor core 171 with its one end located close to the gap G, and a variable magnet 191 disposed at an inner side of the fixed magnet 181 in the radial direction of the rotor core 171.

The rotor 160 may be rotatably accommodated in the stator 130 with a preset gap G (air gap) from the stator 130.

The rotor core 171, for example, may be formed by stacking in an insulating manner a plurality of electric steel plates 172 each having a rotating shaft hole 174 through a center thereof.

The stator 130, for example, may be formed in a cylindrical shape.

Figure 2:
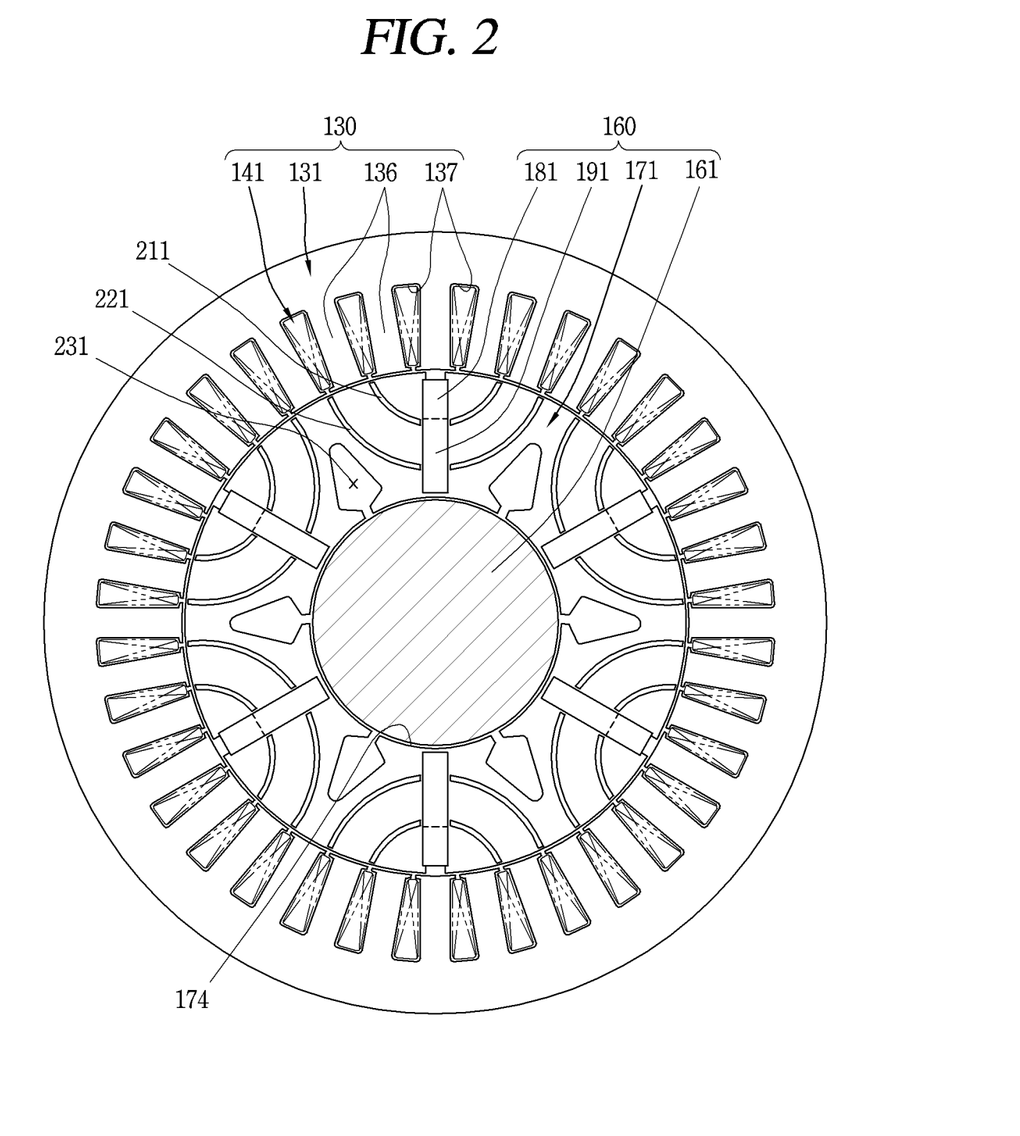
FIG. 2 is a planar view of a stator and a rotor of FIG. 1.

FIG. 2 is a planar view illustrating a coupled state of a stator and a rotor of FIG. 1.

As illustrated in FIG. 2, the stator 130 may include a plurality of teeth 136 and slots 137 formed on a circumference of the rotor accommodating hole 135 in a circumferential direction.

More specifically, the stator 130 may be provided with 36 slots 137.

The stator 130 may be provided with 36 teeth 136.

The stator coil 141 may be constituted by, for example, a distributed winding that is wound around the plurality of slots 137.

The rotor 160 may include a plurality of fixed magnets 181 and variable magnets 191 which are disposed along a radial direction and spaced apart from each other in a circumferential direction.

The fixed magnets 181 and the variable magnets 191 may be arranged linearly along the radial direction of the rotor 160.

More specifically, the fixed magnet 181 may be disposed at an outer side in the radial direction of the rotor core 171 and the variable magnet 191 may be disposed at an inner side of the fixed magnet 181 to be linear with respect to the fixed magnet 181.

The rotor core 171 may be provided at its center with a rotating shaft hole 174 through which the rotating shaft 161 can be inserted.

Figure 3:
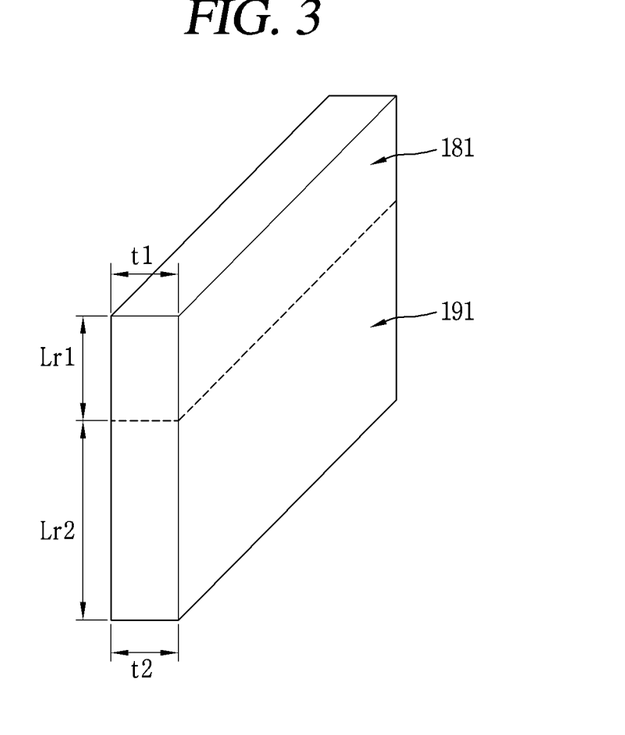
FIG. 3 is a perspective view of a fixed magnet and a variable magnet of FIG. 2.
Figure 4:
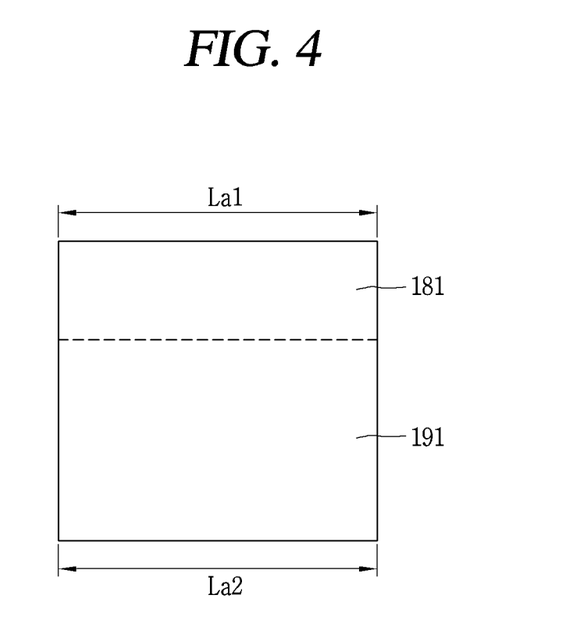
FIG. 4 is a lateral view of the fixed magnet and the variable magnet of FIG. 3.
Figure 5:
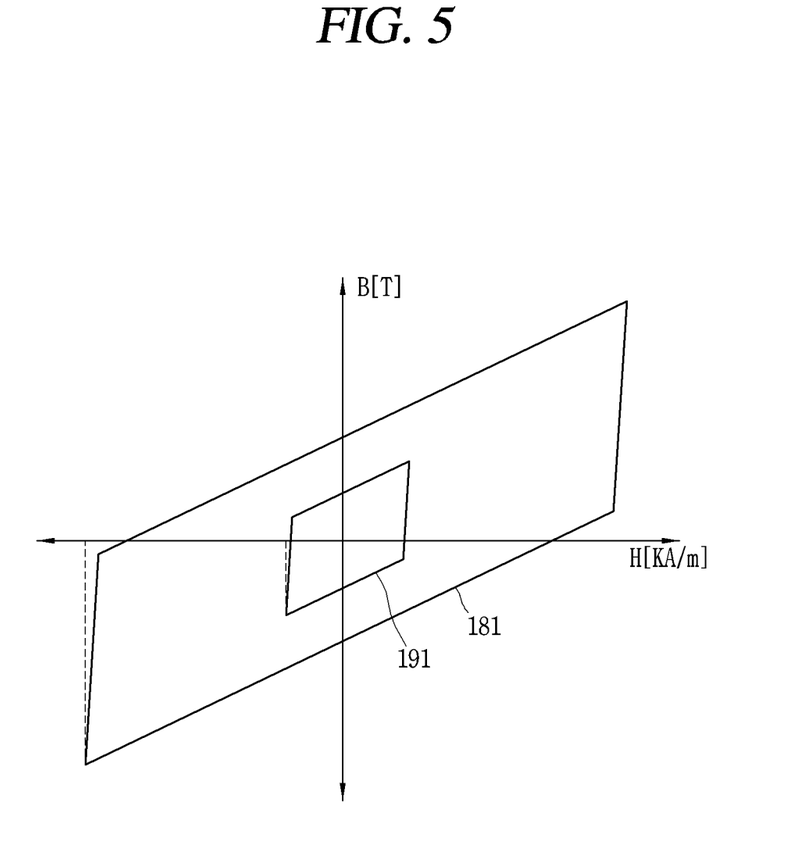
FIG. 5 is a view illustrating magnetic flux density and magnetic field intensity of the fixed magnet and the variable magnet of FIG. 3.

FIG. 3 is a perspective view of the fixed magnet and the variable magnet of FIG. 2, FIG. 4 is a lateral view of FIG. 3, and FIG. 5 is a graph showing magnetic flux density and magnetic field intensity of the fixed magnet and the variable magnet of FIG. 2.

As illustrated in FIG. 3, the fixed magnet 181 and the variable magnet 191 may be formed as one body.

The fixed magnet 181 and the variable magnet 191 may be integrally formed in an injection-molding manner.

This may facilitate fabrication of the fixed magnet 181 and the variable magnet 191.

This may also facilitate the fixed magnet 181 and the variable magnet 191 to be coupled to the rotor core 171.

The thickness t1 of the fixed magnet 181 may be the same as the thickness t2 of the variable magnet 191.

The variable magnet 191 may have a longer radial length Lr2 than a radial length Lr1 of the fixed magnet 181, for example.

In this embodiment, the radial length Lr2 of the variable magnet 191 may be 1.7 to 2.3 times longer than the radial length Lr1 of the fixed magnet 181.

An axial length La1 of the fixed magnet 181, as illustrated in FIG. 4, may be the same as an axial length La2 of the variable magnet 191, for example.

The fixed magnet 181 and the variable magnet 191 may have different coercive forces from each other.

The variable magnet 191, as illustrated in FIG. 5, may have lower coercive force than coercive force of the fixed magnet 181, for example.

More specifically, for example, the variable magnet 191 may have residual magnetic density corresponding to about 30 to 48% of residual magnetic density of the fixed magnet 181.

The variable magnet 191 may have the coercive force corresponding to 8 to 12% of the coercive force of the fixed magnet 181.

The fixed magnet 181 may be configured as a neodymium (Nd) magnet, for example.

The variable magnet 191, for example, may be configured as a ferrite magnet, for example.

This embodiment of the present disclosure discloses that the fixed magnet 181 and the variable magnet 191 are configured as the neodymium magnet and the ferrite magnet formed of different materials, but this is merely illustrative. The present disclosure may alternatively be implemented such that the fixed magnet 181 and the variable magnet 191 are made of the same material but have different coercive forces from each other.

The fixed magnet 181 and the variable magnet 191 may be configured such that different magnetic poles (N poles and S poles) are alternately arranged along the circumferential direction of the rotor core 171.

The fixed magnet 181 and the variable magnet 191 may be magnetized so that different magnetic poles (N pole and S pole) are formed along a thickness direction, respectively.

Figure 6:
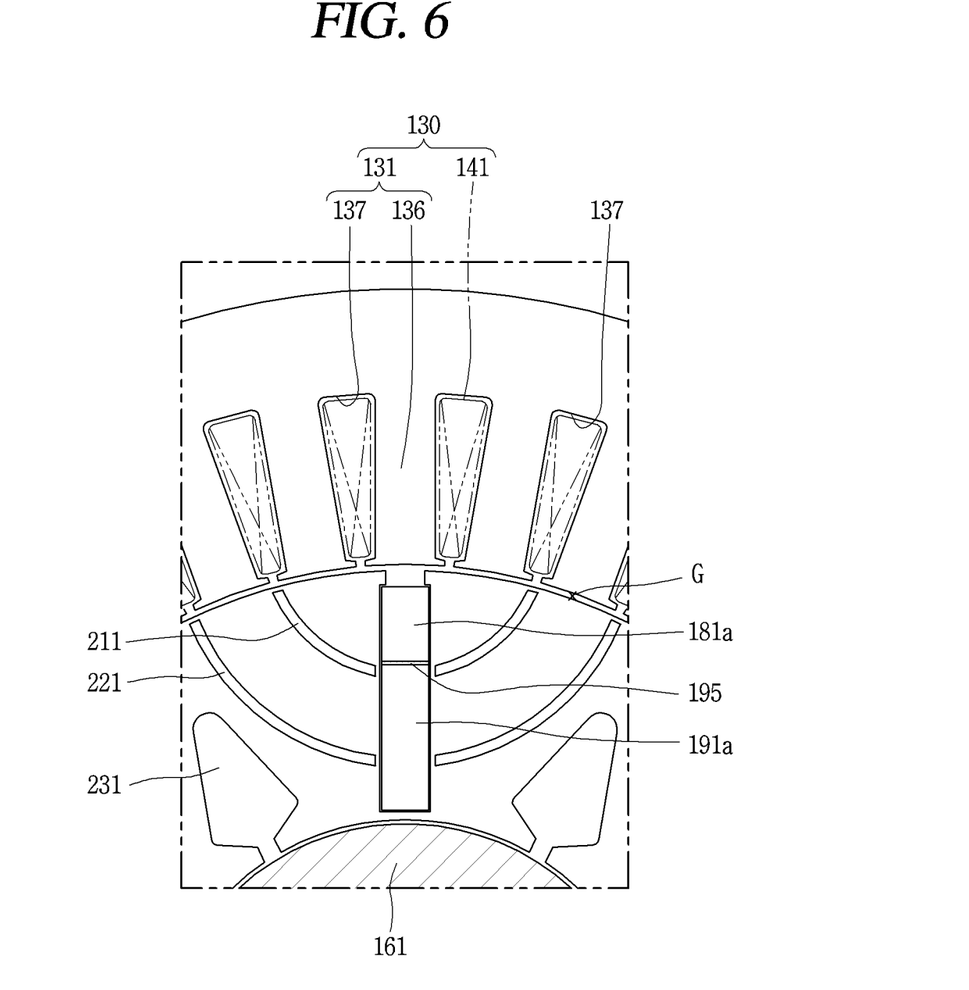
FIG. 6 is a view illustrating a coupled state of a fixed magnet and a variable magnet in accordance with another embodiment of the present disclosure.
Figure 7:
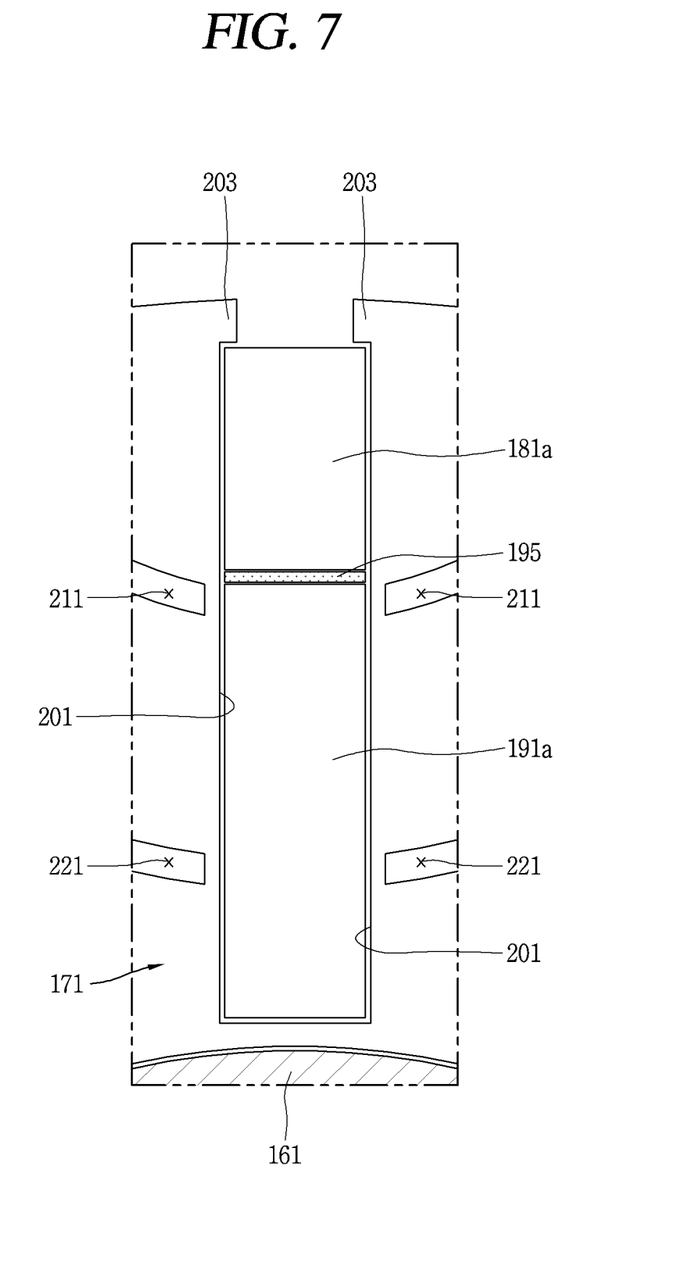
FIG. 7 is an enlarged view of a coupling area of the fixed magnet and the variable magnet of FIG. 6.

FIG. 6 is a view illustrating a coupling area of a fixed magnet and a variable magnet in accordance with another embodiment of the present disclosure, and FIG. 7 is an enlarged view of the coupling area of the fixed magnet and the variable magnet of FIG. 6.

As illustrated in FIG. 6, a fixed magnet 181a and a variable magnet 191a may be formed independently of each other.

The fixed magnet 181a and the variable magnet 191a are formed independently of each other in a predetermined size. When they are coupled to the rotor core 171, the fixed magnet 181a may be disposed at an outer side and the variable magnet 191a may be disposed at an inner side of the fixed magnet 181a.

Also, the fixed magnet 181a and the variable magnet 191a, as illustrated in FIG. 7, may be integrally coupled (bonded) to each other by a binder or adhesive 195 before being coupled to the rotor core 171.

Figure 8:
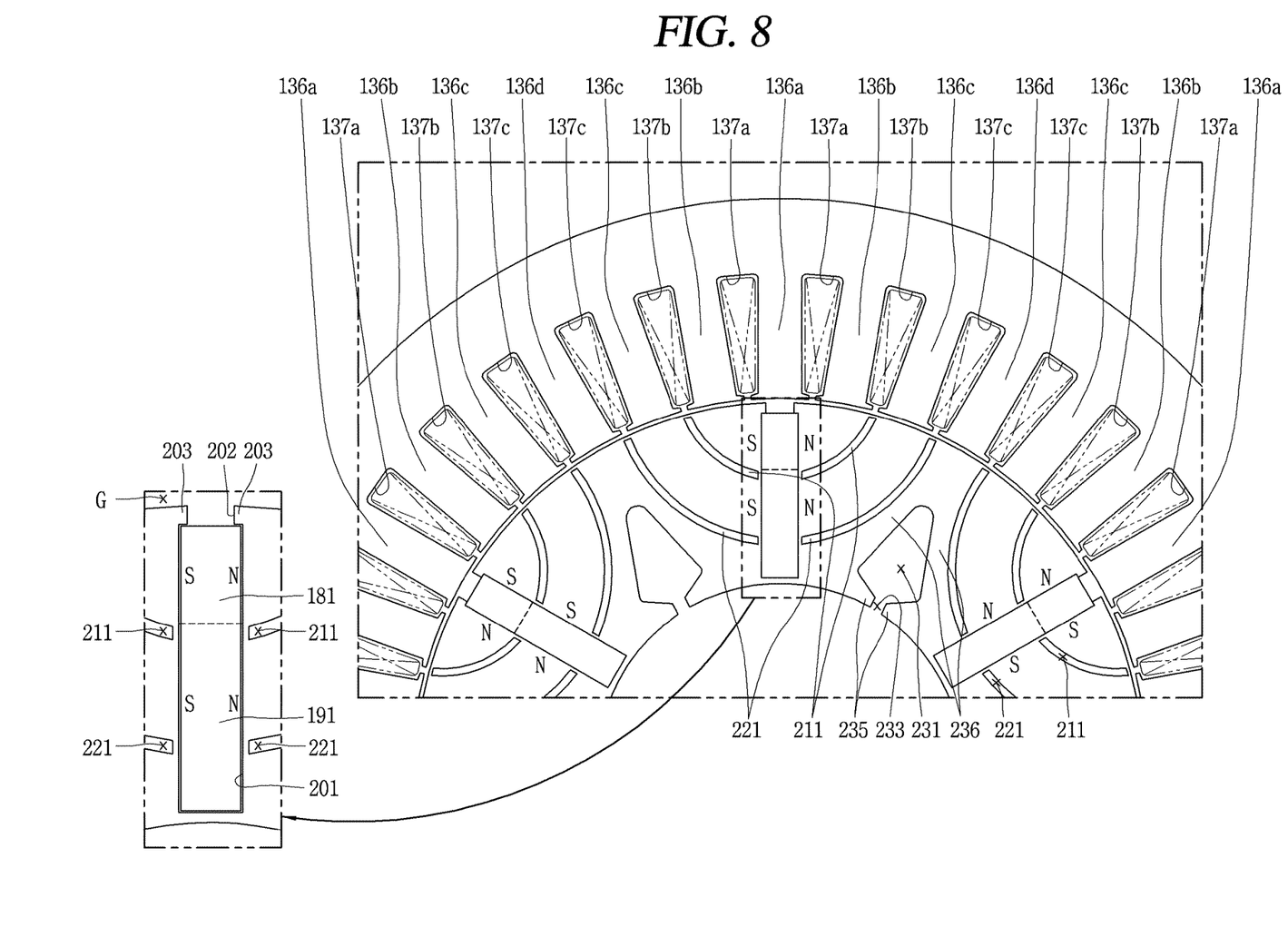
FIG. 8 is an enlarged view illustrating a main part of a coupling area of the stator and the rotor of FIG. 2.

FIG. 8 is an enlarged view illustrating a main part of a coupling state of the stator and the rotor of FIG. 2.

Referring to FIGS. 2 and 8, the rotor 160 may be configured such that different magnetic poles (N poles, S poles) are alternately arranged along the circumferential direction.

The rotor 160 may have six poles.

The rotor core 171 may be provided with a plurality of permanent magnet accommodating portions 201 spaced apart from one another in the circumferential direction.

In this embodiment, the rotor core 171 is provided with six permanent magnet accommodating portions 201 spaced apart from one another in the circumferential direction.

The permanent magnet accommodating portions 201 may be formed in a penetrating manner with being spaced apart at equal angular intervals (for example, 60-degree intervals).

The permanent magnet accommodating portion 201 may be formed so as to be opened outward.

More specifically, each of the permanent magnet accommodating portions 201 may include supporting protrusions 203 formed to support outer corners of the fixed magnet 181 when the fixed magnet 181 is coupled.

An opening 202 may be formed in a cutting manner between the supporting protrusions 203 so that the rotor accommodating hole 135 and the permanent magnet accommodating portion 201 communicate with each other.

With this configuration, the flow of magnetic flux in outer corner areas of the fixed magnet 181 is suppressed, so that demagnetization at the outer corners of the fixed magnet 181 can be prevented.

This may result in extending lifespan of the fixed magnet 181.

Meanwhile, the rotor 160 (rotor core 171) may include an inter-magnet flux barrier 211 provided at a boundary between the fixed magnet 181 and the variable magnet 191.

Accordingly, a path of magnetic flux required upon magnetization and demagnetization of the variable magnet 191 can be secured.

More specifically, the inter-magnet flux barrier 211, for example, may be configured so that one end portion is disposed at a boundary area between the fixed magnet 181 and the variable magnet 191 and another end portion is disposed close to the gap G.

The inter-magnet flux barrier 211 may be formed through the rotor core 171 in a manner that one end portion is adjacent to the permanent magnet accommodating portion 201 and another end portion is adjacent to an outer edge (outer circumferential surface, outer diameter surface) of the rotor core 171.

The inter-magnet flux barrier 211 may be formed in an arcuate shape which is concave with respect to the gap G, for example.

The inter-magnet flux barrier 211 may be formed at each of both sides of the permanent magnet accommodating portion 201.

The rotor 160 (rotor core 171) may include a variable magnet flux barrier 221 for guiding magnetic flux toward the variable magnet 191.

The variable magnet flux barrier 221 may be configured so that one end portion is adjacent to the variable magnet 191 and another end portion is adjacent to the gap G.

More specifically, the variable magnetic flux barrier 221 may be formed through the rotor core 171 in a manner that one end portion is adjacent to the permanent magnet accommodating portion 201 and another end portion is adjacent to the outer edge of the rotor core 171.

The variable magnet flux barrier 221 may be formed in an arcuate shape which is concave with respect to the gap G, for example.

The variable magnet flux barriers 221 and the inter-magnet flux barriers 211 may be formed at substantially the same interval.

In more detail, as illustrated in FIG. 8, when the permanent magnet accommodation portion 201 is disposed to correspond to a first tooth 136a, which is one of a plurality of teeth 136 of the stator 130, the inter-magnet flux barriers 211 may be formed so that their end portions disposed adjacent to the gap G are located to correspond to respective second slots 137b formed between second teeth 136b and third teeth 136c, which are disposed at both sides of the first tooth 136a in a clockwise direction and a counterclockwise direction, respectively, along the circumferential direction of the stator 130.

Also, when the permanent magnet accommodation portion 201 is disposed to correspond to the first tooth 136a, which is one of the plurality of teeth 136 of the stator 130, the variable magnet flux barriers 221 may be formed so that their end portions disposed adjacent to the gap G are located to correspond to respective third slots 137c formed between third teeth 136c and fourth teeth 136d, which are disposed at third and fourth positions, respectively, along the clockwise direction and the counterclockwise direction of the first tooth 136a.

Meanwhile, the rotor 160 (rotor core 171) may include inter-magnetic pole flux barriers 231 disposed between different magnetic poles spaced apart from one another in the circumferential direction of the rotor 160.

The inter-magnetic pole flux barriers 231 may be formed through the rotor core 171 so as to be disposed in the radial direction of the rotor core 171 between the neighboring variable magnets 191, which are disposed consecutively along the circumferential direction of the rotor core 171.

The inter-magnetic pole flux barrier 231 may be formed, for example, so that its inner width gradually increases toward the center of the rotor core 171.

The inter-magnetic pole flux barrier 231 may be provided with linear sections at both sides thereof to be inclined with respect to the radial direction of the rotor core 171.

Thus, magnetic flux passages 236 in which magnetic paths are narrowed outward may be formed at both sides of the inter-magnetic pole flux barrier 231, respectively.

This can prevent a magnetic flux, which is generated respectively in the stator coil 141 and the variable magnet 191 and passes through the variable magnet 191, from flowing along the circumferential direction of the rotating shaft hole 174, and can make the magnetic flux flow along the variable magnet flux barriers 221, thereby shortening a magnetic flux path.

With such a configuration, the magnetic flux passing through both sides (upper and lower sides in the drawing) of the variable magnet flux barrier 221 can be suppressed from being dispersed (distributed) and may be allowed to flow along the shortened paths, thereby enhancing magnetization and demagnetization efficiencies of the variable magnet 191 upon the magnetization and demagnetization of the variable magnet 191.

The inter-magnetic pole flux barrier 231 may be provided with an opening through which one end portion (inner end portion) thereof communicates with the rotating shaft hole 174.

Accordingly, the magnetic flux which has passed through the variable magnet 191 can be suppressed from moving along the circumference of the rotating shaft hole 174.

In addition, loss of the magnetic flux which has passed through the variable magnet 191 can be suppressed, and the flow of the magnetic flux along the variable magnet flux barrier 221 can be realized, thereby enhancing magnetization and demagnetization efficiencies.

Extending portions 235 may protrude from inner end portions (both sides of the opening) of the inter-magnetic pole flux barrier 231, respectively, along the circumferential direction of the rotor core 171.

By forming the extending portions 235, the movement of the magnetic flux along the circumferential direction of the rotating shaft hole 174 can be suppressed, and additionally a coupling force between the rotor core 171 and the rotating shaft 161 can be increased.

Figure 9:
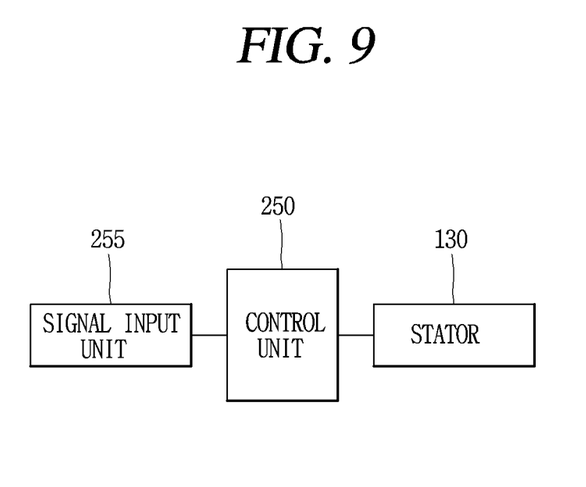
FIG. 9 is a control block diagram illustrating the motor of FIG. 1.
Figure 10:
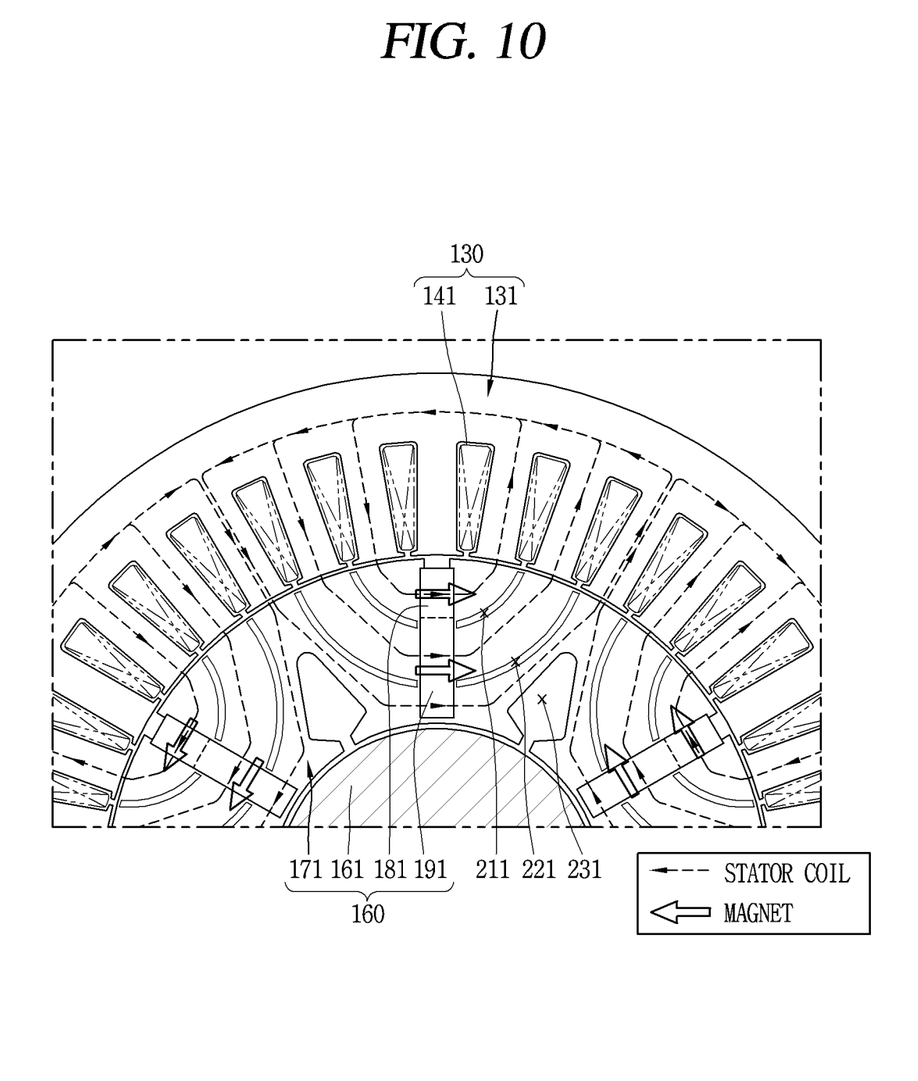
FIG. 10 is a view illustrating magnetization of the variable magnet of FIG. 3.
Figure 11:
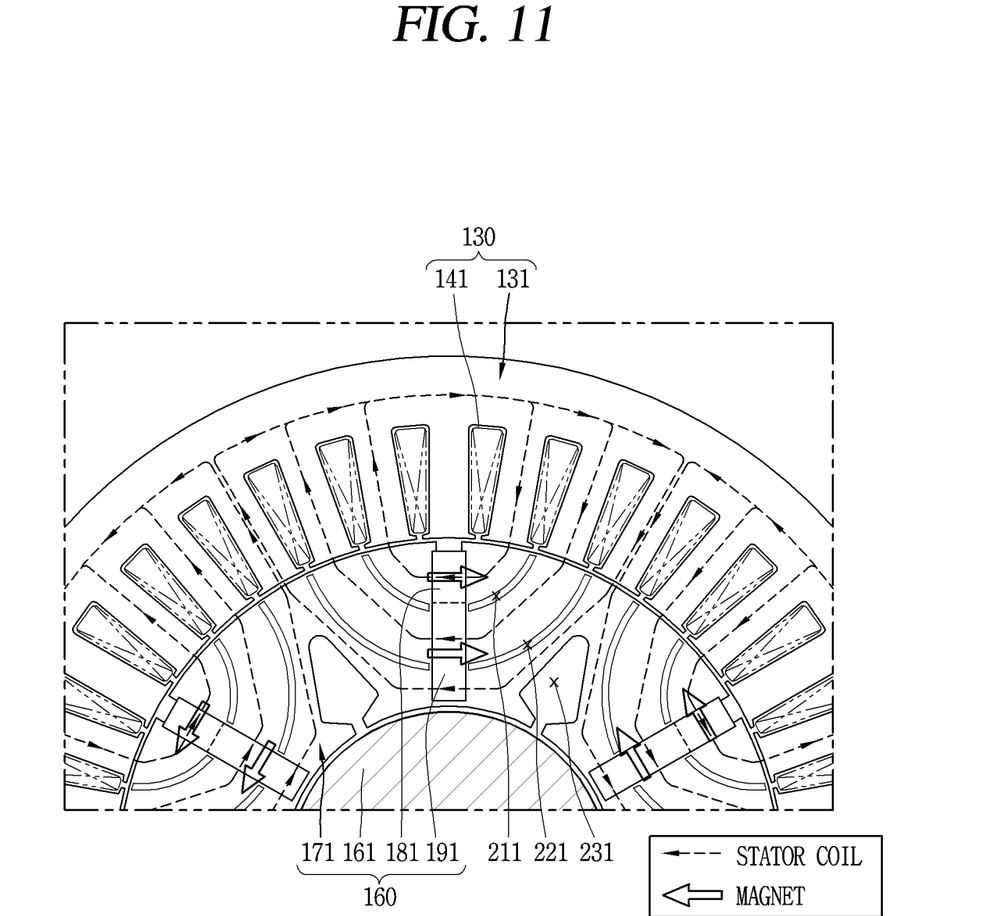
FIG. 11 is a view illustrating demagnetization of the variable magnet of FIG. 3.

FIG. 9 is a control block diagram illustrating the variable flux motor of FIG. 1, FIG. 10 is a view illustrating magnetization of the variable magnet of FIG. 3, and FIG. 11 is a view illustrating demagnetization of the variable magnet of FIG. 3.

As illustrated in FIG. 9, the variable flux motor according to the embodiment of the present disclosure may include a control unit 250 having a control program and configured as a microprocessor.

The control unit 250 may be connected to the stator 130 so as to control the stator 130.

The control unit 250 may be connected to a signal input unit 255 to perform communication so that a control signal for controlling a rotation speed of the rotor 160 can be input.

The variable flux motor according to the embodiment of the present disclosure may be implemented, for example, as a motor for driving wheels of an electric vehicle.

The variable flux motor according to the embodiment of the present disclosure may be implemented, for example, as a driving motor (drum driving motor) of a clothes treating apparatus.

The control unit 250 may be configured to control the stator 130 to magnetize the variable magnet 191, so that torque can increase during a low-speed operation of the rotor 160.

More specifically, the control unit 250 may control the stator 130 (the stator coil 141) to magnetize the variable magnet 191 before the rotor 160 is operated at a preset first speed.

The first speed may be, for example, an uphill (slope) climbing speed of the electric vehicle.

The first speed may be, for example, a rotating speed during a washing stroke and a rinsing stroke of the clothes treating apparatus.

The control unit 250 may control the stator 130 to demagnetize the variable magnet 191, so that torque can decrease during a high-speed operation of the rotor 160.

More specifically, the control unit 250 may control the stator 130 (the stator coil 141) to demagnetize the variable magnet 191 before the rotor 160 is operated at a second speed faster than the first speed.

The second speed may be, for example, a flat running speed of the electric vehicle faster than the first speed.

The second speed may be a dehydration speed of the clothes treating apparatus, for example.

With such a configuration, the control unit 250 can control the stator 130 to magnetize the variable magnet 191 before the rotor 160 is operated at the first speed.

The control unit 250, as illustrated in FIG. 10, may control a current supplying direction of the stator 130 (the stator coil 141) so that the magnetic flux can be formed in the same direction as an initial magnetizing direction of the variable magnet 191.

The control unit 250 may control the stator coil 141 to apply a preset magnitude of current (magnetizing current) to the stator coil 141 when the variable magnet 191 is magnetized.

The control unit 250, for example, may control the preset current (magnetizing current) to be applied instantaneously to the stator coil 141 when the permanent magnet accommodating portion 201 in which the variable magnet 191 is accommodated is located to correspond to the first tooth 136*a*.

When the preset magnitude of current is applied to the stator coil 141, each tooth 136 of the stator core 131 forms a path of magnetic flux which extends from the stator core 131 to the rotor core 171 via the gap G.

The magnetic flux which has moved from each tooth 136 to the rotor core 171 via the gap G may be divided into a magnetic flux passing through the fixed magnet 181 and a magnetic flux passing through the variable magnet 191 due to the inter-magnet flux barrier 211.

The magnetic flux passing through the variable magnet 191 may also be appropriately divided by the variable magnet flux barrier 221 so as to evenly pass through the entire area of the variable magnet 191.

Accordingly, each variable magnet 191 can be magnetized by the magnetic flux generated in the stator coil 141.

At this time, the inter-magnetic pole flux barrier 231 can prevent the magnetic flux passing through the variable magnet 191 from flowing along the circumferential direction of the rotating shaft hole 174 and make the magnetic flux flow along the variable magnet flux barrier 221, thereby enhancing magnetization efficiency.

Here, since the fixed magnet 181 has coercive force remarkably higher than that of the variable magnet 191, the magnitude of the magnetic flux before and after the application of the magnetizing current does not substantially vary regardless of the magnetizing current.

The control unit 250 may control the stator 130 to rotate the rotor 160 at the first speed when the variable magnet 191 is completely magnetized.

Accordingly, the rotor 160 can be operated at the first speed with the torque increased by the magnetization of the variable magnet 191.

On the other hand, the control unit 250 may control the stator 130 to demagnetize the variable magnet 191 before the rotor 160 rotates at the second speed.

The control unit 250 may control the stator 130 so that the magnetic flux can be formed in an opposite direction to the magnetizing direction of the variable magnet 191, before the rotor 160 rotates at the second speed.

The control unit 250 may control a preset magnitude of current (demagnetizing current) to be applied instantaneously to the stator coil 141, as illustrated in FIG. 11, before the rotor 160 is operated at the second speed.

When the preset magnitude of current is applied to the stator coil 141, each tooth 136 of the stator core 131 forms a path of magnetic flux which extends from the stator core 131 to the rotor core 171 via the gap G.

When the magnetic flux generated in the stator 130 passes through the variable magnet 191, the variable magnet 191 may be demagnetized and magnetic force can be remarkably reduced accordingly.

Accordingly, after the demagnetization of the variable magnet 191, the rotor 160 can be rotated by interaction between the magnetic flux generated in the fixed magnet 181 and the magnetic flux generated in the stator coil 141.

The control unit 250 may control the magnetic flux generated in the stator coil 141 to correspond to the magnetic flux generated in the fixed magnet 181, thereby reducing power to be applied to the stator coil 141.

The foregoing description has been given of specific embodiments of the present disclosure. However, the present invention may be embodied in various forms without departing from the spirit or essential characteristics thereof, and thus the above-described embodiments should not be limited by the details of the detailed description.

In addition, even embodiments not listed in the detailed description should be interpreted within the scope of the technical idea defined in the appended claims. It is intended that the present invention cover the modifications and variations of this invention provided they come within the scope of the appended claims and their equivalents.

INDUSTRIAL APPLICATION

The present disclosure can be used and applied in an industrial field using a variable flux motor including permanent magnets.

The invention claimed is:

1. A variable flux motor, comprising:
a stator having a stator coil; and
a rotor configured to be rotatable with respect to the stator and spaced a predetermined distance away from the stator,
wherein the rotor comprises:
  a rotor core;
  a plurality of fixed magnets arranged circumferentially around the rotor core, each fixed magnet having a first end adjacent to the stator; and
  a plurality of variable magnets respectively provided radially inward from the plurality of fixed magnets,
wherein each of the plurality of variable magnets has a lower coercive force than the plurality of fixed magnets,
wherein a magnetic flux of each of the plurality of variable magnets is varied according to a preset current applied to the stator coil, and
wherein the rotor core comprises an inter-magnet flux barrier having a first end adjacent to a boundary between one of the plurality of fixed magnets and one of the plurality of variable magnets and a second end adjacent to the stator.

2. The variable flux motor of claim 1, wherein a polarity of a first side of a first fixed magnet and variable magnet is different from a polarity of a first side of a second fixed magnet and variable magnet facing the first fixed magnet and variable magnet.

3. The variable flux motor of claim 1, wherein the rotor core comprises a variable magnet flux barrier having a first end adjacent to one of the plurality of variable magnets and a second end adjacent to the stator.

4. The variable flux motor of claim 1, wherein the rotor is disposed radially inside the stator, and wherein the stator comprises:
a stator core having a plurality of slots and a plurality of teeth; and
the stator coil wound around the plurality of teeth.

5. The variable flux motor of claim 4, wherein the stator core has 36 slots, and wherein the rotor has six fixed magnets and six variable magnets.

6. The variable flux motor of claim 5, wherein a radial length of the variable magnet is longer than a radial length of the fixed magnet.

7. The variable flux motor of claim 6, wherein the rotor core comprises a variable magnet flux barrier having a first end adjacent to one of the plurality of variable magnets and a second end adjacent to the stator.

8. The variable flux motor of claim 7, wherein when the first end of one of the plurality of fixed magnets corresponds to a first tooth of the plurality of teeth, the second end of the inter-magnet flux barrier corresponds to a slot of the plurality of slots between a second tooth and a third tooth of the plurality of teeth adjacent to the first tooth.

9. The variable flux motor of claim 8, wherein when the first end of one of the plurality of fixed magnets corresponds to the first tooth, the second end of the variable magnet flux barrier corresponds to a slot of the plurality of slots between the third tooth and a fourth tooth of the plurality of teeth.

10. The variable flux motor of claim 5, wherein the rotor core further comprises an inter-magnetic pole flux barrier formed along the radial direction of the rotor core between adjacent variable magnets of the plurality of variable magnets consecutively arranged along the circumferential direction of the rotor core.

11. The variable flux motor of claim 10, wherein an inner width of the inter-magnetic pole flux barrier gradually increases toward a center of the rotor core.

12. The variable flux motor of claim 5, wherein the rotor core comprises a plurality of magnet receptacles into which the plurality of fixed magnets and the plurality of variable magnets are inserted, and wherein each of the plurality of magnet receptacles is formed by cutting into an outer circumferential surface of the rotor core.

13. The variable flux motor of claim 1, wherein the fixed magnet is a neodymium magnet and the variable magnet is a ferrite magnet.

14. The variable flux motor of claim 13, wherein at least one of the plurality of fixed magnets and at least one of the plurality of variable magnets are integrally formed in an injection molding manner.

15. The variable flux motor of claim 13, wherein each of the plurality of variable magnets is magnetized by the stator coil so that a magnetic flux is increased before the rotor is operated at a first predetermined speed.

16. The variable flux motor of claim 15, wherein each of the plurality of variable magnets is demagnetized by the stator coil so that a magnetic flux is decreased before the rotor is operated at a second predetermined speed faster than the first predetermined speed.

17. A variable flux motor, comprising:
a stator comprising a plurality of teeth and a stator coil wrapped around the plurality of teeth; and
a rotor configured to be rotatable with respect to the stator and spaced a predetermined distance away from the stator, wherein the rotor comprises:
  a rotor core;
  a plurality of first magnets arranged circumferentially around the rotor core, each first magnet having a first end adjacent to the stator and a second end opposite the first end; and
  a plurality of second magnets corresponding to the plurality of first magnets, each second magnet having a first end adjacent to the second end of a corresponding first magnet and a second end opposite the first end,
wherein each of the plurality of second magnets has a lower coercive force than the plurality of first magnets, wherein a magnetic flux of each of the plurality of second magnets is varied according to a preset current applied to the stator coil, and wherein the rotor core comprises an inter-magnet flux barrier having a first end adjacent to a boundary area between one of the plurality of first magnets and one of the plurality of second magnets and a second end adjacent to the stator, and a variable magnet flux barrier having a first end adjacent to one of the plurality of second magnets and a second end adjacent to the stator.

18. The variable flux motor of claim 17, wherein each of the plurality of variable magnets is magnetized by the stator coil so that a magnetic flux is increased before the rotor is operated at a first predetermined speed, and wherein each of the plurality of second magnets is demagnetized by the stator coil so that a magnetic flux is decreased before the rotor is operated at a second predetermined speed faster than the first predetermined speed.

* * * * *